United States Patent [19]

Jones et al.

[11] 3,823,895

[45] July 16, 1974

[54] AUTOMATIC TAPE LOADING APPARATUS AND METHOD THEREFOR

[75] Inventors: Hale M. Jones, Playa de Rey; James P. Urynowicz, Los Angeles, both of Calif.

[73] Assignee: Ampex Corporation, Redwood City, Calif.

[22] Filed: Mar. 3, 1972

[21] Appl. No.: 231,648

[52] U.S. Cl. .................. 242/186, 242/182, 242/195

[51] Int. Cl. ...................... G11b 15/66, G11b 15/58

[58] Field of Search ........... 242/182, 183, 184, 185, 242/186, 195; 226/95, 97, 118

[56] References Cited

UNITED STATES PATENTS

| | | | |
|---|---|---|---|
| 3,393,878 | 7/1968 | Aweida et al. | 242/182 |
| 3,473,042 | 10/1969 | Orlando | 242/186 X |
| 3,628,749 | 12/1971 | Ort et al. | 242/188 X |
| 3,643,889 | 2/1972 | Krause | 242/182 |

*Primary Examiner*—George F. Mautz

[57] ABSTRACT

Apparatus having an automatic tape loading path extending between a file reel and a machine reel, such as a digital magnetic tape transport, incorporates a physical end of tape (PEOT) sensor, an air jet forcing the physical end against the sensor, and control electronics. As the file reel is rotated in the tape wind direction after loading, the air jet forces a length of tape near the physical end thereof into contact with the sensor which provides a control signal when the physical end of the tape passes the sensor. The control electronics continue rotation of the file reel through a predetermined angular distance to align the physical tape end with a preload point of an automatic tape loading path. This apparatus simplifies tape loading by automatically aligning the physical tape end with the tape loading path and provides a fully automatic detection of improper loading and a retry if a first attempt at automatic threading is not successful.

9 Claims, 3 Drawing Figures

AUTOMATIC TAPE LOADING APPARATUS AND METHOD THEREFOR

BACKGROUND OF THE INVENTION

1. Field of the Invention

This invention relates to tape transports and more particularly to digital magnetic tape transports having an automatic tape load feature.

2. History of the Prior Art

Systems which transfer a web member between a file reel and a take-up reel often have an automatic loading path. For instance, digital magnetic tape transports are now widely used that have such an automatic tape threading feature. The operator merely inserts a file reel containing tape, positions the physical end of the tape (PEOT) at a preload point or zone, and pushes an automatic load button. Carefully located tape guides, which frequently include air jets, then guide the tape along the loading path and cause it to secure to and begin winding on the take-up (machine) reel. Sensors located along the tape path which frequently include the beginning of tape (BOT) and end of tape (EOT) sensors generate a load error signal if the tape does not load properly. For this purpose the tape itself may be sensed by the sensors; if loaded properly the tape is positioned with the BOT marker at a given position. The load error signal causes the automatic load operation to cease, preventing damage to the tape when the load operation is not proceeding properly.

In these prior art systems, initial positioning of the PEOT is controlled manually and is therefore often subject to carelessness and error. If the leading edge of the tape is not guided properly, as particularly is apt to happen if the edge is distorted or damaged, the leading edge may catch and loop so that the tape does not thread properly. The operator must then rewind the extended tape, reposition the PEOT at the preload point and begin the automatic load cycle anew. Not only does this procedure often involve excessive delay but an operator who tends to use an improper procedure is apt to make the same mistakes repeatedly.

SUMMARY OF THE INVENTION

An automatic tape loading system in accordance with the invention properly prepositions the physical end of an elongated web member such as magnetic tape at a preload point of a web control device such as a digital magnetic tape transport. A sensor such as a vacuum sensor is positioned a known distance from the preload position for the physical end of the tape (PEOT), and a tape separator such as an air jet is positioned to impinge on the tape pack in a selected region in which the tape end is free to fall loosely. As positioning controls rotate the file reel in a rewind direction (counterclockwise), the PEOT is first separated from the tape pack and a portion of the tape near the physical end is directed into contact with the sensor. As the file reel continues to rotate counterclockwise, the tape and PEOT are drawn across the sensor casuing a PEOT position or control signal to be generated. The PEOT position signal affirmatively identifies the position of the physical tape end, and by operation of the positioning controls the reel is rotated at a preselected velocity and for a predetermined time to traverse the fixed distance required to position the PEOT at the preload zone. The automatic threading sequence is then initiated.

In the event the automatic threading sequence is not completed successfully for some reason, a load error signal is generated. This signal is then used to initiate a second positioning and automatic threading sequence rather than just shutting down the machine. To do this the PEOT is again moved past the PEOT sense point, returned to the preload zone and automatic threading is again initiated. Thus, all an operator need do is put a reel of tape on the machine and push a button. The machine will then automatically preposition the PEOT, thread the tape and try again in the event the threading operation is not successful.

BRIEF DESCRIPTION OF THE DRAWINGS

A better understanding of the invention may be had from a consideration of the following detailed description taken in conjunction with the accompanying drawings in which.

DETAILED DESCRIPTION

Figure 1:
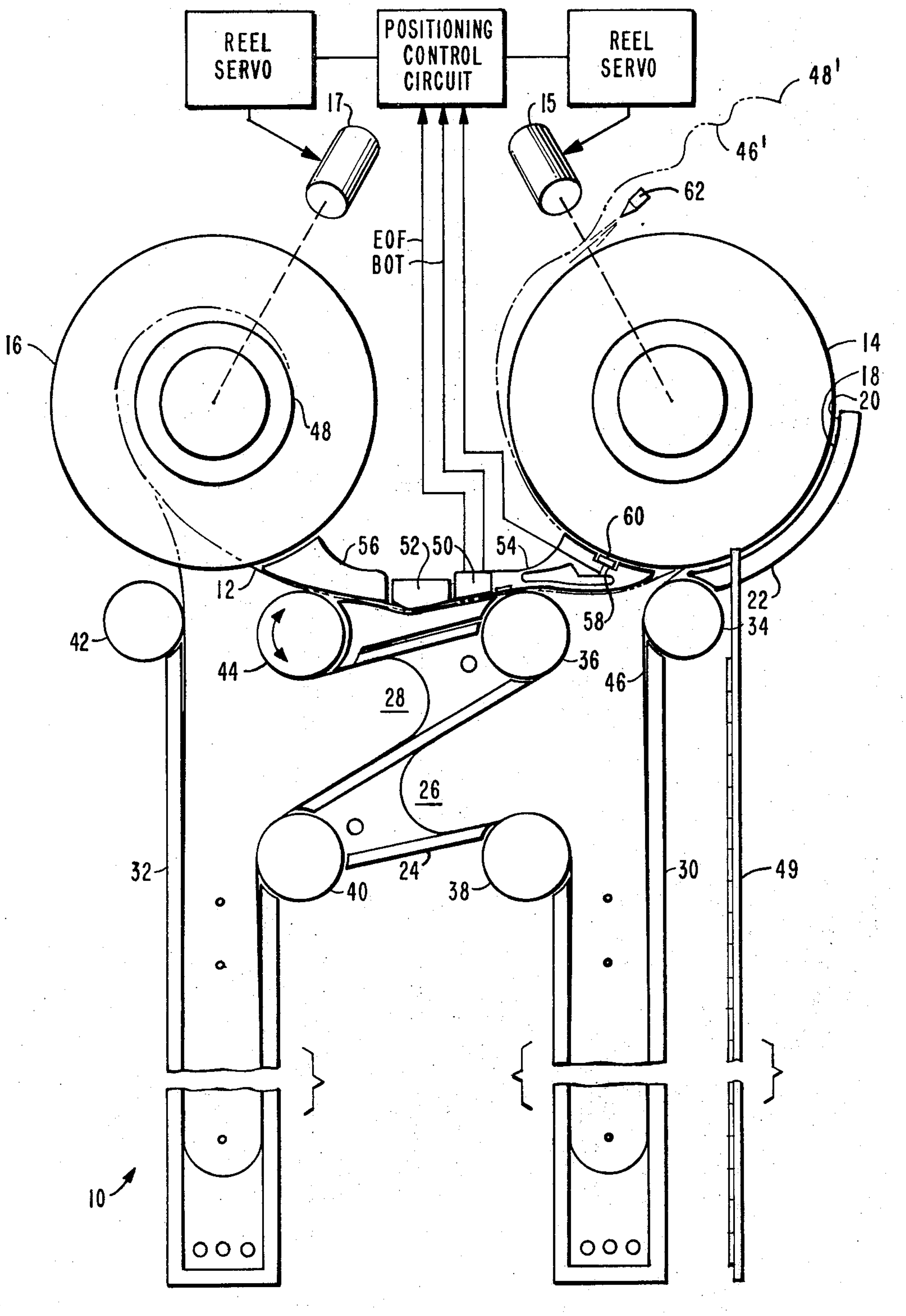
FIG. 1 is a front view of a digital magnetic tape transport having an automatic tape loading apparatus in accordance with the invention.
Figure 2:
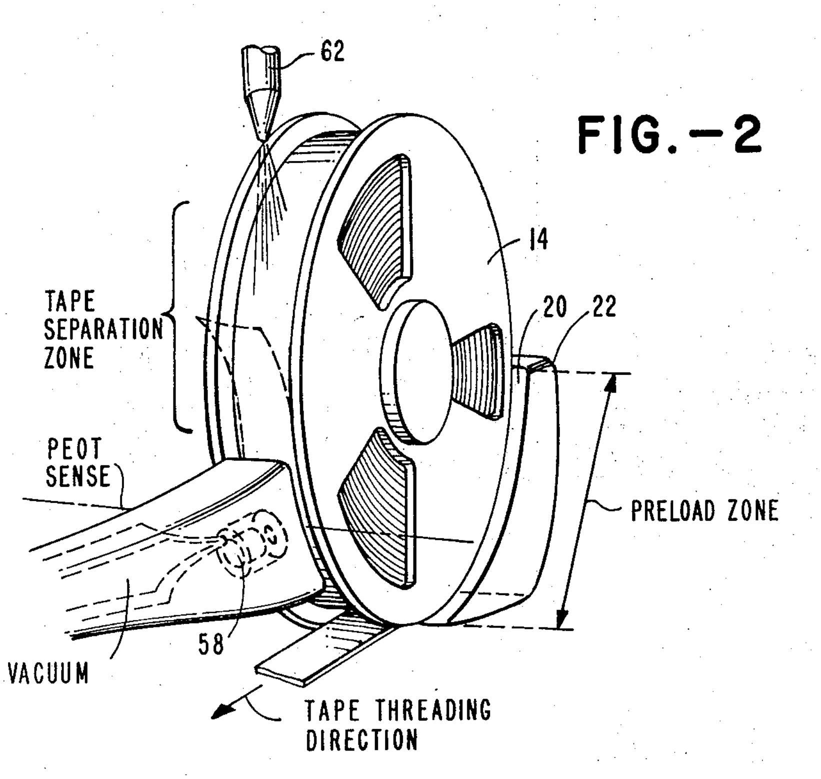
FIG. 2 is a fragmentary perspective view of a portion of the arrangement of FIG. 1, showing further details thereof.

As shown in FIGS. 1 and 2, a machine for controlling a web member may comprise a digital magnetic tape transport 10 having an automatic tape threading path 12 extending between a file reel 14 driven by a reel motor 15 and a take-up (machine) reel 16 driven by a reel motor 17. The reel motors 15, 17 are controlled by a positioning control circuit operating in conjunction with reel servos as shown in block diagram form in FIG. 1. The tape threading path 12 begins at a preload point or zone 18 along a concave surface 20 of a load shroud 22 which is positioned adjacent the file reel. The concave surface 20 generally conforms to the outer circumference of the file reel 14 and the physical end of tape (PEOT) must be positioned along the surface 20 before automatic threading can be properly initiated. The tape on the file reel 14 is wound so that the PEOT trails when the reel 14 is rotated counterclockwise.

If the PEOT is properly prepositioned, a conventional automatic threading sequence will cause the PEOT to move along the automatic tape threading path 12 and begin to wind onto the take-up reel 16 as the file reel 14 is rotated clockwise. The elements normally found in a digital magnetic tape transport of the automatic loading type are located along the tape threading path in a conventional manner. Located on a back side of the tape path 12 midway between the two reels 14, 16 is an N-shaped tapered vacuum chamber assembly 24. The assembly 24 provides two tapered, low inertia tape buffers 26, 28 for the reels 14, 16 respectively. Also positioned along the back side of the tape threading path 12 are a file reel vacuum chamber 30 between the buffer 26 and the file reel 14 and a take-up reel vacuum chamber 32 between the buffer 28 and the take-up reel 16. Air bearings 34, 36, 38, 40 and 42 are positioned at the mouths of the buffers 26, 28 and vacuum chambers 30, 32 which operate in a conventional manner to permit high speed control of a low inertia section of tape with a degree of independence of the relatively high inertia tape reels 14, 16. A capstan 44 is positioned at the mouths of the buffer 28 and vacuum chamber 32 to control the movement of the low inertia section of tape. After the leading physical end 48 of the tape 46 is partially wound onto the take-up reel 16, partial vacuum is applied to the buffers 26, 28 and vacuum chambers 30, 32 to automatically form buffer loops. A hinged front cover 49 (depicted as being opened to 90°) provides a front closure for buffers 26, 28 and vacuum chambers 30, 32.

Mounted within the vacuum assembly 24 is a conventional sensor assembly 50 having a beginning of tape (BOT) photosensor and an end of tape (EOT) photosensor. These sensors are located side by side along the width of the tape path 12 and each senses light generated by a light source as it reflects from a reflective marker occupying one-half the tape width to indicate the beginning or end of a recording region (as distinguished from the physical end of the tape). The reflective markers are placed on the back or non-oxide side of the tape 48 and if on the half toward the operator it indicates BOT. If on the half away from the operator it indicates EOT. Since the tape 48 is non-reflecting except for the markers, an optical input to both sensors indicates that the tape is not present along the tape path 12 in the vicinity of the sensor assembly 50. An optical input to neither sensor indicates that a portion of tape not having a BOT or EOT marker is positioned along the tape path 12 adjacent the sensor assembly 50, i.e., simply that tape is present. Additional sensors of either the optical or vacuum type may be located at other locations along the tape threading path 12 if desired. The position of the sensor assembly 50 may be virtually anywhere along the threading path but in any event must be known for positioning control.

Positioned adjacent the top side of the tape threading path are a recording head 52, a first guide 54 positioned between the file reel 14 and the head 52, and a second guide 56 positioned between the head 52 and the takeup reel 16. Positioned within the guide 54 adjacent the periphery of the file reel 14 is a sensing device which may be a vacuum switch 58. The vacuum switch 58 is located adjacent the periphery of the file reel 14 a known angular distance from the preload point 18. The PEOT passes the vacuum switch 58 prior to reaching the preload point 18 as the reel 14 rotates in the wind (counterclockwise) direction. When an external orifice 60 of the vacuum switch 58 is covered by magnetic tape, a partial vacuum is created which closes the normally open switch 58.

A tape separating device such as an air jet 62 is positioned adjacent the file reel 14 in the arc intermediate the vacuum switch 58 and the preload point 18. As the file reel 14 is rotated counterclockwise, the PEOT first passes the air jet 62 and then the switch 58.

As best seen in FIG. 2, the PEOT is impinged upon by the air jet 62 in the region in which the terminal end of the tape 48 is approximately vertical. The angle of impingement is nearly tangential and in the direction to separate the tape from the tape pack. The switch 58 and jet 62 are connected to conventional vacuum and pressure sources respectively which are not shown.

As the PEOT 48' is rotated counterclockwise or in a wind direction past the air jet 62, the PEOT 48' is separated from the tape pack. Gravity and air flow then cause a short section of tape near the PEOT 48' to engage and close the adjacent orifice 60 of the vacuum switch 58. Once the orifice is closed, the partial vacuum behind the orifice 60 holds the tape 46' in contact with the associated face of the first guide 54 until the PEOT 48' is pulled past the switch 58 position as the file reel 14 continues to rotate counterclockwise. As the PEOT 48' passes the switch 58 vacuum is lost and the switch 58 opens providing a PEOT position signal 59 (FIG. 3) to indicate that the PEOT 48' is at the switch 58. The file reel 14 is then further rotated the known distance required to place the PEOT 48' at the preloading point 18 before the automatic threading sequence is initiated. Since the PEOT 48' is rotating at a known velocity and must rotate a known circumferential distance from the sensor 58 to the preload point 18, prepositioning can be accomplished by continuing to rotate the PEOT for a predetermined period of time after generation of the position signal 59.

Figure 3:
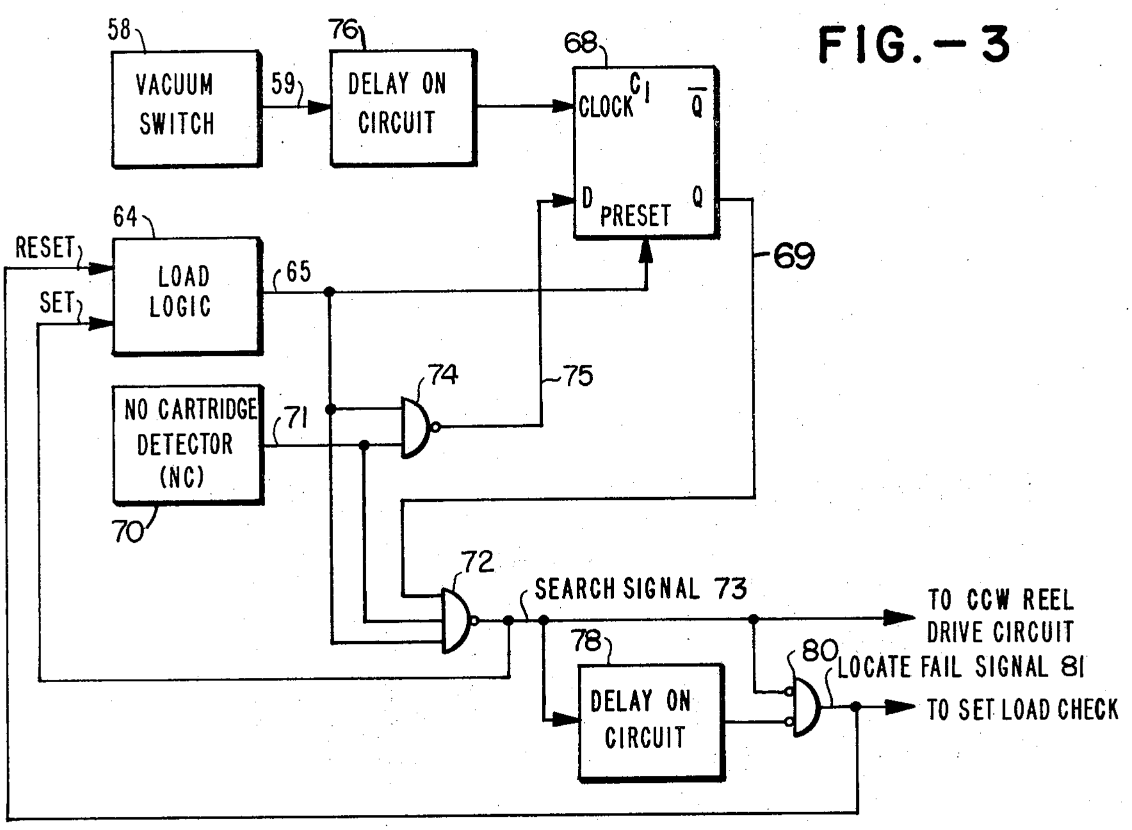
FIG. 3 is a schematic and block diagram of a control circuit for use in positioning the physical end of tape in conjunction with the arrangement of FIGS. 1 and 2.

A schematic diagram of a circuit arrangement which may be used to preposition the PEOT is shown in FIG. 3. A prepositioning sequence is initiated when an operator depresses a manual autoload switch (not shown), thereby setting the load logic 64. The load logic 64 may be a conventional arrangement for sequencing the transport through a relatively long series of operations and checks to complete the automatic threading process. The output 65 from load logic 64 indicates that the transport 10 is in a load condition and presets a flip flop 68 having a Q output 69 causing the Q output 69 to go true. If a standard file reel 14 rather than a cartridge is being used, the no cartridge detector 70 produces a positive output signal 71. All three inputs 65, 69 and 71 to a NAND gate 72 are then true and its search signal output 73 goes false. Counterclockwise reel drive circuits (not shown) respond to this low or false search signal output 73 from NAND gate 72 and begin driving the file reel 14 in a counterclockwise or wind direction at a predetermined velocity. If a cartridge is being used instead of the file reel 14, there is no need for the prepositioning procedure and the search signal output 73 is inhibited. When both outputs 65 and 71 are true, they enable a NAND gate 74 and cause its output 75, which is connected to the D input of flip-flop 68, to go low or false. The reel drive circuit continues to rotate the file reel 14 counterclockwise until the PEOT passes the vacuum switch 58, generating a position signal 59. The position signal 59 is delayed by delay on circuit 76 a predetermined period of time required for the PEOT to almost reach the preload point 18. As the PEOT approaches the preload point 18, the flip-flop 68 is clocked by the delayed position signal 59, switching the Q output of flip-flop 68 to a false state. This causes the output of NAND gate 72 to go true, turning off the counterclockwise reel drive circuit and telling the load logic 64 that the PEOT is at the preload point 18. The file reel rapidly decelerates to a stop with the PEOT at the preload point 18.

The search signal 73 also connects through a second delay on circuit 78 to one input of a negative input AND gate 80 and also directly to another input of the gate 80. The delay on circuit 78 interposes a delay of about two seconds between the time the search signal 73 goes low and the time the locate fail output signal 81 goes true. This gives the transport 10 two seconds to preposition the PEOT at the preload point 18 and switch out of the search mode. If the search signal 73 stays false more than two seconds (indicating a malfunction), the locate fail signal 81 goes true, setting the load check (not shown) and resetting the load logic 64. The load check controls an indicator light on the operator panel which tells the operator that there has been a failure in the loading sequence. Resetting of the load logic terminates the load sequence and causes the output signal 65 to go false.

Even after the preposition portion has been properly executed a failure may occur during the remainder of the loading sequence. For this reason the load logic 64 periodically checks on the progress of the threading operation as through the sensor assembly 50. If a failure is detected by one of these checks, the load logic is reset to the beginning of the load sequence. This causes output 65 to go false and then true again, thereby presetting flip-flop 68 and reinitiating the prepositioning portion of the load sequence.

Although there has been described above a specific arrangement of an automatic tape loading system in accordance with the invention for the purpose of illustrating the manner in which the invention may be used to advantage, it will be appreciated that the invention is not limited thereto. Accordingly, any and all modifications, variations or equivalent arrangements which may occur to those skilled in the art should be considered to be within the scope of the invention.

What is claimed is:

1. For use in a digital magnetic tape transport having a reel of tape and an automatic tape threading mechanism operable when the physical end of the tape is prepositioned at a loading region, a positioner and sensor device comprising:

a loading region for moving the tape therethrough for self-threading of the tape;

switch means physically separated from the loading region and positioned adjacent the periphery of the file reel of tape for sensing the presence of the physical end of the tape and generating a position signal in response thereto; and means responsive to the position signal for rotating the reel of tape so as to position the physical end of the tape at the loading region.

2. An automatic loading system for use in a web transport system for moving an elongated web member having a terminal length adjacent a physical end between a file reel and a take-up reel and having an automatic threading mechanism requiring prepositioning of the physical end at a preload point adjacent the periphery of the file reel, comprising:

an air jet mechanism positioned adjacent the periphery of the file reel at a location spaced apart from the preload point, said air jet mechanism acting to force a terminal length of the web member near the physical end thereof away from the file reel as the reel is rotated in the wind direction;

a vacuum sensor positioned adjacent the periphery of the file reel between the preload point and the air jet mechanism at a selected circumferential spacing from the preload point, said sensor being positioned to be engaged by the terminal length of the web member and generating a position signal as the physical end passes the sensor;

means for rotating the file reel in a wind direction at a selected velocity upon initiation of an automatic load sequence;

means responsive to the position signal for generating a delayed position signal, the delay being approximately equal to the time required for the physical end to move from the sensor to the preload point at the selected velocity in the wind direction;

means responsive to the delayed position signal for terminating wind rotation of the file reel and initiating the automatic threading sequence; and means responsive to the rotating means and the delayed position signal for generating a locate fail signal when wind rotation continues for a selected period of time without generation of the delayed position signal.

3. The invention as set forth in claim 2 above, wherein the web transport system is a digital tape transport.

4. In a web transport system having a file reel containg a helically wound elongated web member, a loading region adjacent the file reel, and a sensor positioned adjacent the file reel and physically displaced from the loading region, the method of positioning the physical end of the web member at the loading region comprising the steps of:

rotating the reel in a wind direction;

detecting the passage of the physical end of the web member past the sensor;

continuing to rotate the reel in the wind direction after detecting the passage of the physical end of the web member past the sensor to position the physical end of the web member at the loading region; and stopping the reel with the physical end of the web member at the loading region.

5. In a web control device having a longitudinal web member with a physical end wound on a file reel and a preload position for an automatic threading mechanism, a circuit for prepositioning the physical end of the web member at the preload position comprising:

a bistable circuit having first and second stable states;

load logic means for generating a signal to begin a load sequence;

means responsive to generation of the signal by the load logic means for placing the bistable circuit in the first stable state;

means responsive to the bistable circuit for driving the file reel in a selected direction when the bistable circuit is in the first stable state;

sensor means disposed adjacent the file reel and operative to generate a signal when the physical end of the web member passes thereby;

means responsive to generation of the signal by the sensor means for defining a selected time delay, the time delay being selected to allow the physical end of the web member to move from the sensor to the preload position;

means for placing the bistable circuit in the second stable state upon termination of the time delay; and means responsive to the bistable circuit for reversing the direction of drive of the file reel when the bistable circuit is placed in the second stable state.

6. The invention as set forth in claim 5 above, further comprising means responsive to the bistable circuit for defining a second selected time delay when the bistable circuit is placed in the first stable state and means for providing a locate fail signal to the load logic means when the file reel is driven in the selected direction longer than the second selected time delay.

7. The invention as set forth in claim 6 above, wherein the second selected time delay is approximately 2 seconds.

8. For use in a web control device having a longitudinal web member wtih a physical end wound on a file reel and a preload position for an automatic threading mechanism, an end of tape sensor comprising:

means for rotating the file reel in a wind direction;

a sensor device positioned adjacent the periphery of the file reel, said device generating a position signal whenever the physical end passes thereby; and means responsive to the position signal for generating a control signal a fixed period of time after the generation of the position signal to position the physical end adjacent the preload position, said control signal terminating rotation in the wind direction and initiating an automatic threading sequence.

9. For use in a web control device having a longitudinal web member with a physical end wound on a file reel and a preload position for an automatic threading mechanism, an end of tape sensor comprising:

means for rotating the file reel in a wind direction;

an air jet mechanism positioned adjacent the periphery of the file reel at a location spaced apart from the preload position, said air jet mechanism acting to force a terminal length of the web member near the physical end thereof away from the file reel as the reel is rotated in the wind direction;

a vacuum sensor positioned adjacent the periphery of the file reel between the preload position and the air jet mechanism to be engaged by the terminal length of the web member and generating a position signal as the physical end passes the sensor; and means responsive to the position signal for generating a control signal when the file reel has rotated a sufficient distance subsequent to the position signal to position the physical end adjacent the preload position, said control signal terminating rotation in the wind direction and initiating an automatic threading sequence.

* * * * *